United States Patent [19]
Akitomo et al.

[11] Patent Number: 5,861,449
[45] Date of Patent: Jan. 19, 1999

[54] CLAY-LIKE ORGANOPOLYSILOXANE COMPOSITION

[75] Inventors: Hiroshi Akitomo; Tsugio Nozoe, both of Chiba Prefecture, Japan

[73] Assignee: Dow Corning Toray Silicone Co., Ltd., Tokyo, Japan

[21] Appl. No.: 61,406

[22] Filed: May 12, 1993

[30] Foreign Application Priority Data

May 26, 1992 [JP] Japan ................................. 4-158526

[51] Int. Cl.$^6$ ............................................... C08J 5/54
[52] U.S. Cl. ............................................ 524/269; 524/506
[58] Field of Search ....................................... 524/269, 506

[56] References Cited

U.S. PATENT DOCUMENTS

| | | | |
|---|---|---|---|
| 4,578,413 | 3/1986 | Sterling | 524/269 |
| 4,849,564 | 7/1989 | Shimiyu et al. | 524/317 |
| 4,977,200 | 12/1990 | Itoh et al. | 524/506 |

*Primary Examiner*—Jeffrey Smith
*Attorney, Agent, or Firm*—Robert L. McKellar

[57] ABSTRACT

The introduction of a clay-like organopolysiloxane composition that is highly qualified for application as a clay-like material for manual arts and crafts and handicrafts (children's modelling clay, handicraft clay, etc.) and that does not deteriorate with time, is highly workable, is freely deformable by the application of low stresses, and, once formed, can preserve its shape while in the quiescent state.

2 Claims, No Drawings

CLAY-LIKE ORGANOPOLYSILOXANE COMPOSITION

DETAILED DESCRIPTION OF THE INVENTION

The present invention relates to a clay-like organopolysiloxane composition and, more specifically, to a clay-like organopolysiloxane composition that is an ideal clay-like material for manual arts and crafts and handicrafts (hereinafter also referred to as clay-like handworking material), e.g., children's modelling clay, handicraft clay, and so forth.

PRIOR ART

Wheat flour clay is used as a clay-like handworking material for children's modelling clay and handicraft clay because it is very safe and hygienic.

Synthetic rubber clay comprising a dispersion of synthetic resin powder in a synthetic rubber such as silicone rubber is proposed in Japanese Patent Publication Number 54-28772 [28,772/1979] as a clay-like handworking material. A synthetic resin clay that consists of the mixture of semisolid atactic polypropylene, spindle oil (softener), and silicone oil (plasticizer) is proposed in Japanese Patent Application Laid Open Number 49-73233 [73,233/1974] as a clay-like handworking material.

However, wheat flour clay gradually hardens after unsealing and cannot be used as a handworking material over long periods of time. The above-described synthetic rubber clay and synthetic resin clay suffer from poor surface tack, and when used as handworking materials are only poorly releasable or separable from molds and forms. Moreover, these materials are also poorly workable because they have a strong tendency to stick to the hands and working jigs. Finally, these clay-like handworking materials are not completely satisfactory in terms of safety and hygiene.

The present inventors developed the present invention as the result of extensive investigations directed at solving the drawbacks associated with the heretofore known clay-like handworking materials.

The present invention takes as its object the introduction of a clay-like organopolysiloxane composition that is free of the problems described above, that has an excellent workability, and whose use is free of concerns about safety or hygiene.

The present invention relates to a clay-like organopolysiloxane composition comprising (A) 100 weight parts diorganopolysiloxane that has a viscosity of at least 300,000 centistokes at 25° C., (B) 5 to 500 weight parts synthetic resin powder, and (C) 10 to 100 weight parts liquid paraffin.

With specificity, the diorganopolysiloxane comprising the component (A) used by the present invention is the base component of the composition and it must have a viscosity of at least 300,000 centistokes at 25° C.

This diorganopolysiloxane is exemplified by diorganopolysiloxanes having the following general formula.

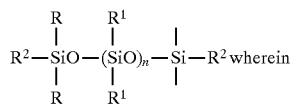

R in this formula comprises monovalent hydrocarbon groups and is exemplified by alkyl groups such as methyl, ethyl, and propyl; alkenyl groups such as vinyl and hexenyl; and aryl groups such as phenyl. $R^1$ in the preceding formula also comprises monovalent hydrocarbon groups and is exemplified by alkyl groups such as methyl, ethyl, and propyl; alkenyl groups such as vinyl and hexenyl; and aryl groups such as phenyl. $R^2$ in the preceding formula represents $R^1$ and the hydroxyl group, and n has a value that on average provides a viscosity of at least 300,000 centistokes at 25° C.

This diorganopolysiloxane is specifically exemplified by trimethylsiloxy-terminated dimethylpolysiloxanes, trimethylsiloxy-terminated dimethylsiloxane-methylvinylsiloxane copolymers, trimethylsiloxy-terminated dimethylsiloxane-methylphenylsiloxane copolymers, dimethylhydroxysiloxy-terminated dimethylpolysiloxanes, and dimethylhydroxysiloxy-terminated dimethylsiloxane-methylvinylsiloxane copolymers.

Among the diorganopolysiloxanes considered above, the use of hydroxyl-endblocked diorganopolysiloxane is preferred in the present invention. Also preferred for use in the present invention is a diorganopolysiloxane that consists of a mixture of diorganopolysiloxane gum with a viscosity at 25° C. of at least 1,000,000 centistokes and liquid diorganopolysiloxane with a viscosity below 300,000 centistokes at 25° C.

The synthetic resin powder comprising component (B) used by the present invention is a crucial component for endowing the composition of the present invention with a clay-like quality. This synthetic resin powder is exemplified by powders prepared from polyethylene resins, polypropylene resins, ethylene-vinyl acetate copolymer resins, fluororesins, ethylene-acrylic acid copolymer resins, and silicone resins. Particularly preferred are polyolefin resin powders, which are typified by polyethylene resin powder. The combination of 2 or more of these resin powders may also be employed.

The optimal quantity of component (B) is subject to some variation depending on the type of synthetic resin, but in general component (B) should be added at 5 to 500 weight parts and preferably at 20 to 200 weight parts per 100 weight parts of diorganopolysiloxane comprising component (A). When component (B) is present at less than 5 weight parts, the resulting clay is unable to retain a particular shape. Moreover, the surface tack increases and a considerable stickiness is manifested at less than 5 weight parts component (B). On the other hand, the viscosity becomes impractically high at a component (B) addition exceeding 500 weight parts.

The liquid paraffin comprising component (C) functions to reduce the viscosity of the composition of the present invention and thereby facilitate its handling and improve its workability. Moreover, this component facilitates release or separation from molds and forms by imparting slip or lubricity to the composition of the present invention.

Component (C) should be present at 10 to 100 weight parts and preferably at 10 to 50 weight parts per 100 weight parts diorganopolysiloxane comprising component (A). When component (C) is present at less than 5 weight parts, an adequate lubricity will not be obtained and release or separation from molds and forms becomes problematic. The lubricity becomes impractically high when component (C) is present at more than 100 weight parts.

The composition of the present invention consists of the components (A), (B), and (C) as described above. However, in addition to components (A), (B), and (C) the composition of the present invention may contain the following insofar as the object of the present invention is not impaired: colorant such as iron oxide red, titanium oxide, and ultramarine blue; plasticizer; filler such as silica filler, diatomaceous earth, quartz powder, talc, and clay; and internal mold-release agents.

The clay-like organopolysiloxane composition of the present invention is prepared simply by mixing components (A), (B), and (C) with one another to homogeneity using a known mixing device such as a two-roll, three-roll, or kneader-mixer.

Handworking material suitable for use by infants and children preferably has a plasticity value in the range of 100 to 200 as measured with a Williams plastometer.

The composition of the present invention as described hereinbefore is characterized by unique rheological characteristics to the effect that it is freely deformable and moldable at low stresses while being capable of retaining its induced shape when allowed to stand after molding. Other characteristic features of the composition of the present invention are its easy release or separation from forms and molds and its lack of stickiness for the hands and working jigs. These characteristic features make the composition of the present invention ideal for use as children's modelling clay, handicraft clay, and so forth.

EXAMPLES

The present invention is explained in greater detail below using illustrative and comparison examples. Each composition was evaluated by measuring the timed variation in plasticity, releasability from polypropylene resin, and adhesion to the hands of a worker during handling. The timed variation in plasticity and the releasability from polypropylene resin were measured by the following test methods.

Timed Variation in Plasticity

The clay-like organopolysiloxane composition was held in the air at 25° C. and the timed variation in the Williams plasticity was measured.

Test of Releasability From a Form

The clay-like organopolysiloxane composition was pressed into a form (20 mm (length)×20 mm (width)×8 mm (depth)) made of polypropylene resin and then removed. The presence/absence of adhesion by residues of the clay-like organopolysiloxane composition to the form was visually evaluated.

Example 1

Using a kneader-mixer, a clay-like organopolysiloxane composition was prepared by mixing 130 weight parts polyethylene resin powder (Flocen UF-20 from Sumitomo Seika Kabushiki Kaisha) and 25 weight parts liquid paraffin (Sumoil P350 from Matsumura Sekiyu Kenkyusho Kabushiki Kaisha) into a mixture of 70 weight parts dimethylpolysiloxane with a viscosity of 10,000,000 centipoise at 25° C. (40 mol % of molecular chain terminal groups=dimethylhydroxysiloxy, 60 mol %=dimethylvinylsiloxy group) and 30 weight parts trimethylsiloxy-terminated dimethylpolysiloxane with a viscosity of 100,000 centipoise at 25° C. This composition was submitted to measurement of the timed variation in plasticity, form releasability, and stickiness for the hands, and these results are reported in Tables 1, 2, and 3 below.

Example 2

Using a two-roll mill, a clay-like organopolysiloxane composition was prepared by mixing 100 weight parts polypropylene resin powder (Floblen B-200 from Sumitomo Seika Kabushiki Kaisha) and 20 weight parts liquid paraffin (Sumoil P350 from Matsumura Sekiyu Kenkyusho Kabushiki Kaisha) into 100 weight parts dimethylhydroxysiloxy-terminated dimethylsiloxane-methylvinylsiloxane copolymer with a viscosity at 25° C. of 5,000,000 centipoise. This composition was submitted to measurement of the timed variation in plasticity, form releasability, and stickiness for the hands, and these results are reported in Tables 1, 2, and 3 below.

Comparison Example 1

A clay-like organopolysiloxane composition was prepared as in Example 1, but in this case omitting the liquid paraffin used in Example 1. The properties of this composition were measured as in Example 1, and these measurement results are reported in Tables 1, 2, and 3 below.

Comparison Example 2

A clay-like organopolysiloxane composition was prepared as in Example 1, but in this case using 80 weight parts diatomaceous earth powder in place of the 25 weight parts liquid paraffin used in Example 1. The properties of this composition were measured as in Example 1, and these measurement results are reported in Tables 1, 2, and 3 below.

Comparison Example 3

The properties of a commercial wheat flour clay were measured as in Example 1. These measurement results are also reported in Tables 1, 2, and 3 below.

TABLE 1

Timed variation in plasticity

| | measurement values | | | | |
|---|---|---|---|---|---|
| | Example 1 | Example 2 | Comp. Example 1 | Comp. Example 2 | Comp. Example 3 |
| initial | 128 | 150 | 260 | 240 | 190 |
| 7 days | 129 | 153 | 260 | 243 | could not be measured |
| 14 days | 131 | 154 | 262 | 246 | could not be measured |
| 30 days | 133 | 158 | 263 | 255 | could not be measured |

TABLE 2

Form releasability

| Example 1 | Example 2 | Comparison Example 1 | Comparison Example 2 | Comparison Example 3 |
|---|---|---|---|---|
| excellent release, no adhesion to the form | excellent release, no adhesion to the form | poor release, adhered to the form | poor release, adhered to the form | excellent release, no adhesion to the form |

TABLE 3

Adhesion to the hands

| Example 1 | Example 2 | Comparison Example 1 | Comparison Example 2 | Comparison Example 3 |
|---|---|---|---|---|
| did not stick to the hands | did not stick to the hands | moderate adhesion to the hands | adhered to the hands, and removal was difficult | did not stick to the hands |

The clay-like organopolysiloxane composition of the present invention is characterized by the absence of timed variations in its behavior, by an excellent workability, by its facile deformability and moldability under the application of low stresses, and by the ability to retain its shape when standing after molding. In its application as a handworking material for arts and crafts, it is characterized by its easy release from forms and molds and by its lack of stickiness for the hands and working jigs.

That which is claimed is:

1. Clay-like organopolysiloxane composition having a Williams plasticity within the range of 100 to 200 consisting essentially of
   (A) 100 weight parts of a diorganopolysiloxane having a viscosity of at least 300,000 centistokes at 25° C.,
   (B) 5 to 500 weight parts of a synthetic resin powder, and
   (C) 10 to 100 weight parts of a liquid paraffin.

2. Clay-like organopolysiloxane composition according to claim 1 in which the diorganopolysiloxane comprising component (A) is composed of
   (a) diorganopolysiloxane gum that has a viscosity of at least 1,000,000 centistokes at 25° C. and
   (b) liquid diorganopolysiloxane that has a viscosity at 25° C. below 300,000 centistokes.

* * * * *